March 25, 1958 E. L. CONDRA Re. 24,445

PIPE REAMER AND MILL

Original Filed April 29, 1955

INVENTOR.
ELMO L. CONDRA,
BY
N. M. Pruehman
ATTORNEY.

United States Patent Office

Re. 24,445
Reissued Mar. 25, 1958

24,445

PIPE REAMER AND MILL

Elmo L. Condra, Long Beach, Calif.

Original No. 2,782,850, dated February 26, 1957, Serial No. 504,891, April 29, 1955. Application for reissue September 16, 1957, Serial No. 684,631

13 Claims. (Cl. 164—.8)

Matter enclosed in heavy brackets [ ] appears in the original patent but forms no part of this reissue specification; matter printed in italics indicates the additions made by reissue.

This invention relates to a pipe reamer and mill which is used in oil, gas or water wells for the purpose of severing pipe which may be in the well, or for the purpose of cutting what is termed a window in the pipe if it is necessary to by-pass or deflect the hole for any reason. My tool may also be used as a router or a means of completely pulverizing a section of pipe after that section has been severed from the main portion of the pipe.

An object of my invention is to provide a novel pipe reamer and mill which can be easily inserted in the pipe and the cutters of which can be readily moved into engagement with the pipe for the purpose of cutting or reaming the same.

Another object of my invention is to provide a novel pipe reamer and mill in which the cutters are pressed against the inside of the pipe by means of a block which is pressed against the pipe on the side opposite the cutters.

Another object of my invention is to provide a novel pipe reamer and mill in which the activating block is pressed against the inside of the pipe by means of fluid pressure. This fluid pressure is exerted from the surface of the well by means of the usual slush pump.

Still another object of my invention is to provide a novel pipe reamer and mill in which the activating block which presses the cutters against the pipe is urged outwardly by being caused to move upwardly on an inclined rod; this upward movement being achieved by connecting the block to a fluid actuated piston, the fluid pressure being achieved from a pump at the surface of the well.

*A still further object of the invention is to supply a novel pipe reamer and mill in which the cutter is only disposed in a cutting position during the time hydraulic pressure is maintained on the interior of the device, and is of such construction that upon cessation of maintenance of the hydraulic pressure, the cutters disengage from the tubular member being reamed or milled upon upward movement of the invention.*

*Yet another object of the invention is to provide a pipe reamer and mill in which the lateral force exerted by the cutters on the tubular member on which work is being performed is controllable not only by the pressure exerted on the hydraulic fluid used in actuating same, but on the differential in surface areas existing between the lower surface of a piston and the upper surface of a tube associated therewith which are both contacted by the actuating hydraulic fluid.*

*A further object of the invention is to supply a pipe reamer and mill in which the cutter actuating piston moves upwardly in a direction opposite that to the flow of the actuating fluid.*

Other objects, advantages and features of invention may appear from the accompanying drawing, the subjoined detailed description and the appended claims.

Figure 1:
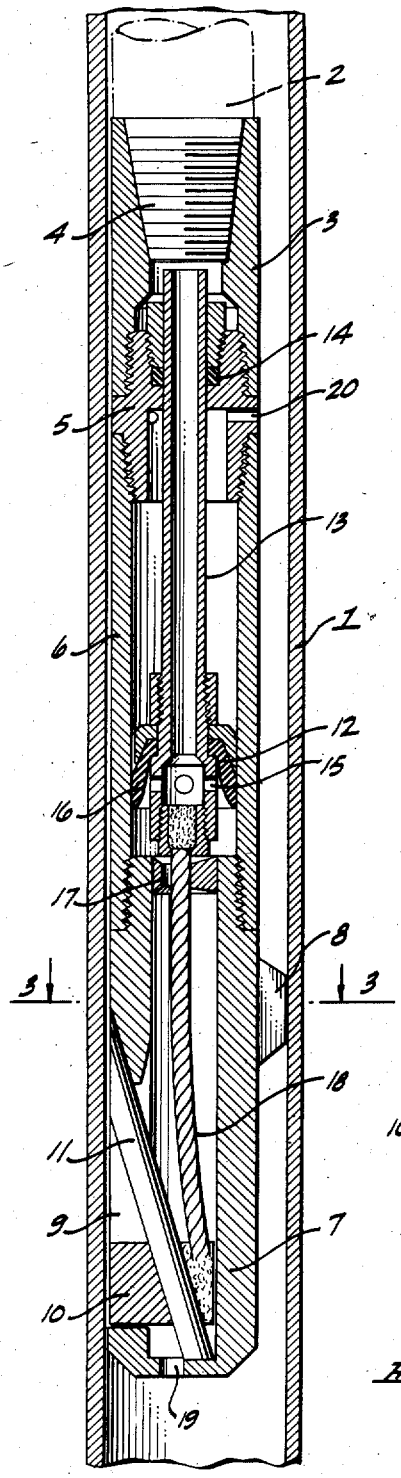
Figure 1 is a longitudinal sectional view of my pipe reamer and mill.

Referring more particularly to the drawing, the numeral 1 indicates the pipe or casing, and it is this pipe which is to be cut or severed in order that the casing or pipe might be removed from the well, or that a section thereof might be completely pulverized or ground up for the purpose of drilling through the pipe at an angle to the center line of the casing, or for other purposes. My pipe reamer and mill is operated on drill pipe 2, all of which is usual and well known in the art.

The pipe reamer and mill consist of a coupling 3 which is threaded as shown at 4 to receive the threaded connection of the drill pipe 2. A fitting 5 is threaded into the coupling 3 and the purpose of this fitting will be further described. A pipe section 6 is threaded onto the lower end of the fitting 5 and this pipe section forms a cylinder for the fluid actuated mechanism, as will be further described. A mandrel 7 is threaded onto the lower end of the pipe or cylinder 6, and this mandrel has cutting or reaming teeth 8 projecting from one side thereof. An opening or window 9 is provided through the wall of the mandrel 7 on the side opposite the teeth 8. An activating block 10 is positioned within the mandrel 7 and is adapted to move vertically within the mandrel and to be projected through the window 9. The block 10 is slidably mounted on an inclined rod 11 and this rod is fixedly attached within the mandrel 7 so that the block 10 will be moved outwardly through the window 9 as the block moves upwardly on this rod.

A piston 12 is mounted within the cylinder 6 and moves upwardly in this cylinder under fluid pressure, as will be further described. A tube 13 rises from the piston 12 and extends through the fitting 5. Suitable packing 14 in the fitting 5 surrounds the tube 13 and prevents fluid from leaking around the outside of this tube. A plurality of outlet ports 15 are provided in the piston and the ports communicate with the tube 13. Thus fluid under pressure from the drill pipe 2 can flow downwardly through the tube 13 and out through the ports 15 to expand the cup 16 of the piston, and thus exert its pressure below the piston. A restricted orifice 17 at the upper end of the mandrel 7 restricts the flow of fluid therethrough, creating an upward pressure in the cylinder 6 and below the piston 12, thus urging the piston upwardly in the cylinder. A cable or other flexible connection 18 is attached at one end to the block 10 and at the other end to the piston 12. This cable extends through the orifice or port 17 thus further restricting this orifice. A fluid outlet hole 19 is provided in the bottom of the mandrel 7 so that circulating fluid can pass out of the tool at this point. A bleed hole 20 is provided in the fitting 5 so that any fluid which might accumulate above the piston 12 can readily surge in and out of the space above the piston without hindering the movement thereof.

In operation my pipe reamer and mill is lowered into the casing 1 to the point desired. When this point is reached fluid from the slush pump is forced into the drill pipe 2 and this fluid passes downwardly through the drill pipe, thence through the tube 13 out through the ports 15 and is restricted in its further downward flow by the orifice 17. The restriction at 17 thus creates an upward pressure against the bottom of the piston 12 urging the piston upwardly in the cylinder 6. An upward pull on the cable 18 now moves the block 10 upwardly on the inclined rod 11. The block 10 moves out through the window 9 and presses against the inside of the casing 1, thus pressing the cutters 8 on the opposite side of the mandrel 7 against the inside of the casing 1. Rotation of the drill pipe 2 will now cause the cutters 8 to cut or sever the casing 1. A continued upward pressure is exerted on the block 10, thus continuously pressing the cutters 8 into the casing 1 until the casing is entirely severed. The amount of pressure which is exerted on the teeth 8 to press them against the casing 1 can be changed as required by changing the fluid pressure of the slush pump.

*It will be apparent from an inspection of Figure 1 that the lower surface of piston 12 and the upper horizontal ring-shaped surface of tube 13 are both in contact with hydraulic fluid discharged downwardly through drill pipe 2 to my pipe reamer and mill positioned therebelow. Likewise, it will be apparent that there is a substantial differential in area between the lower surface of piston 12 contacting by the hydraulic fluid when projected onto a horizontal plane and the horizontal area of the upper extremity of tube 13. This differential in surface areas exposed to the hydraulic fluid is responsible not only for the upward movement of piston 12 in a direction opposite to that of the flow of the hydraulic fluid, but also as this differential is increased, the lateral force exerted by the cutters 8 as they assume pressure contact with casing 1, can be increased. Thus, the force exerted by cutters 8 may be controlled not only by the fluid pressure of the slush pump, but by the differential in surface areas as above mentioned.*

Figure 2:
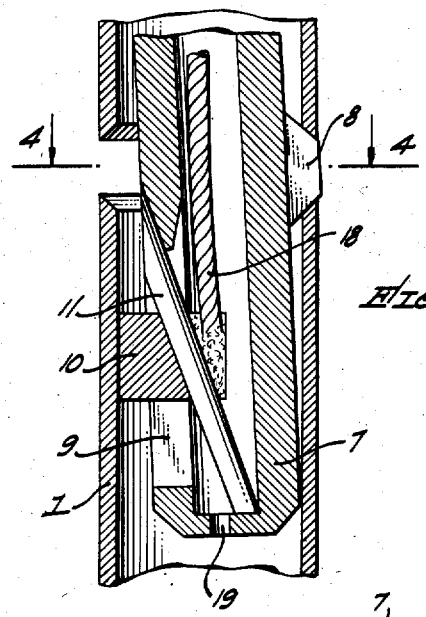
Figure 2 is a fragmentary longitudinal sectional view of the lower part of my pipe reamer and mill, and showing the cutters in position of completely severing the pipe.
Figure 3:
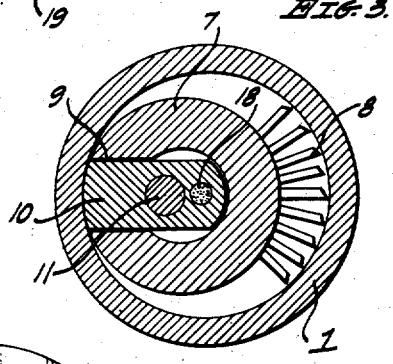
Figure 3 is a sectional view taken on line 3—3 of Figure 1.
Figure 4:
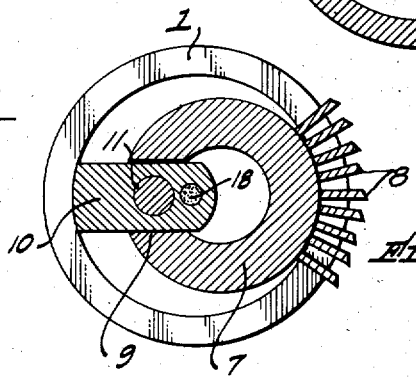
Figure 4 is a sectional view taken on line 4—4 of Figure 2.

*My pipe reamer and mill provides operational advantages in that it cannot be stuck in the pipe or casing 1, for the piston 12 is only moved upwardly to actuate cutters 8 to a cutting position when pressure is maintained on the fluid. Accordingly, when it is desired to disengage the cutters 8 from the tubular member on which work is being performed, pressure is merely removed from the hydraulic fluid and upward movement imparted to drill pipe 2. This last-mentioned operation results in downward movement of the cutters 8 relative to cylinder 6 from the position shown in Figures 2 and 4 to that illustrated in Figures 1 and 3 where my pipe reamer and mill is free to be raised or lowered in pipe or casing.*

Having described my invention, I claim:

1. A pipe reamer and mill comprising a coupling adapted to be attached to a drill pipe, a cylinder below the coupling, means connecting the cylinder and the coupling, a piston in said cylinder, a tube rising from the piston and extending through said means, said tube being open at the top and the bottom thereof, the bottom opening below the piston, a mandrel attached to the cylinder, cutters on one side of the mandrel, a block, said mandrel having a window therein through which said block may move, means mounting said block on the mandrel for vertical and lateral movement in said window, and means connecting said block and the piston.

2. A pipe reamer and mill comprising a coupling adapted to be attached to a drill pipe, a cylinder below the coupling, means connecting the cylinder and the coupling, a piston in said cylinder, a tube rising from the piston and extending through said means, said tube being open at the top and the bottom thereof, the bottom opening below the piston, a mandrel attached to the cylinder, cutters on one side of the mandrel, a block, said mandrel having a window therein through which said block may move, means mounting said block on the mandrel for vertical and lateral movement in said window, and means connecting said block and the piston, and a restricting orifice in the lower part of the cylinder, said orifice being below the piston.

3. A pipe reamer and mill comprising a coupling adapted to be attached to a drill pipe, a cylinder below the coupling, means connecting the cylinder and the coupling, a piston in said cylinder, a tube rising from the piston and extending through said means, said tube being open at the top and the bottom thereof, the bottom opening below the piston, a mandrel attached to the cylinder, cutters on one side of the mandrel, a block, said mandrel having a window therein through which said block may move, an inclined rod positioned within the mandrel, said block being slidably mounted on the rod for vertical and lateral movement in said window, and means connecting said block and the piston.

4. A pipe reamer and mill comprising a coupling adapted to be attached to a drill pipe, a cylinder below the coupling, means connecting the cylinder and the coupling, a piston in said cylinder, a tube rising from the piston and extending through said means, said tube being open at the top and the bottom thereof, the bottom opening below the piston, a mandrel attached to the cylinder, cutters on one side of the mandrel, a block, said mandrel having a window therein through which said block may move, means mounting said block on the mandrel for vertical and lateral movement in said window, a cable attached at one end to the block and at the other end to the piston.

5. A pipe reamer and mill comprising a coupling adapted to be attached to a drill pipe, a cylinder below the coupling, means connecting the cylinder and the coupling, a piston in said cylinder, a tube rising from the piston and extending through said means, said tube being open at the top and the bottom thereof, the bottom opening below the piston, a mandrel attached to the cylinder, cutters on one side of the mandrel, a block, said mandrel having a window therein through which said block may move, an inclined rod positioned within the mandrel, said block being slidably mounted on the rod for vertical and lateral movement in said window, and means connecting said block and the piston, and a restricting orifice in the lower part of the cylinder, said orifice being below the piston.

6. A pipe reamer and mill comprising a coupling adapted to be attached to a drill pipe, a cylinder below the coupling, means connecting the cylinder and the coupling, a piston in said cylinder, a tube rising from the piston and extending through said means, said tube being open at the top and the bottom thereof, the bottom opening below the piston, a mandrel attached to the cylinder, cutters on one side of the mandrel, a block, said mandrel having a window therein through which said block may move, means mounting said block on the mandrel for vertical and lateral movement in said window, a cable attached at one end to the block and at the other end to the piston, and a restricting orifice in the lower part of the cylinder, said orifice being below the piston.

7. A pipe reamer and mill comprising a coupling adapted to be attached to drill pipe, a cylinder below the coupling, a fitting connecting the cylinder and the coupling, a piston in said cylinder, a tube rising from the piston and extending through said fitting, packing means in the fitting around the tube, said tube being open at the top and bottom thereof, the bottom opening being below the piston, a mandrel below and attached to said cylinder, cutters on one side of the mandrel, a block, said mandrel having a window therein through which said block may move, means mounting said block in the mandrel for vertical and lateral movement in said window, and means connecting said block and the piston.

8. A pipe reamer and mill comprising a coupling adapted to be attached to drill pipe, a cylinder below the coupling, a fitting connecting the cylinder and the coupling, a piston in said cylinder, a tube rising from the piston and extending through said fitting, packing means in the fitting around the tube, said tube being open at the top and bottom thereof, the bottom opening being below the piston, a mandrel below and attached to said cylinder, cutters on one side of the mandrel, a block, said mandrel having a window therein through which said block may move, an inclined rod in the mandrel, said block being slidable on the rod for vertical and lateral movement in said window, and means connecting said block and the piston.

9. A pipe reamer and mill comprising a coupling adapted to be attached to drill pipe, a cylinder below the coupling, a fitting connecting the cylinder and the coupling, a piston in said cylinder, a tube rising from the piston and extending through said fitting, packing means in the fitting around the tube, said tube being open at the top and bottom thereof, the bottom opening being below the piston, a mandrel below and attached to said cylinder, cutters on one side of the mandrel, a block, said mandrel having a window therein through which said block may move, means mounting said block in the mandrel of vertical and lateral movement in said window, and a cable connecting said block and the piston.

10. A pipe reamer and mill comprising a coupling adapted to be attached to drill pipe, a cylinder below the coupling, a fitting connecting the cylinder and the coupling, a piston in said cylinder, a tube rising from the piston and extending through said fitting, packing means in the fitting around the tube, said tube being open at the top and bottom thereof, the bottom opening being below the piston, a mandrel below and attached to said cylinder, cutters on one side of the mandrel, a block, said mandrel having a window therein through which said block may move, means mounting said block in the mandrel for vertical and lateral movement in said window, and a cable connecting said block and the piston, and a restricting orifice in the lower part of the cylinder, said orifice being below the piston.

*11. A pipe reamer and mill actuatable by hydraulic fluid under pressure to cut a tubular member disposed in a well bore and including a coupling adapted to be attached to the lower extremity of a drill pipe, comprising: elongate tubular body-defining means smaller in transverse cross-sectional area than that of said tubular member and adapted to be raised and lowered therein, said body-defining means depending from said coupling and in which body-defining means a longitudinally extending confined space is defined that communicates with both a first bore situated thereabove and an orifice positioned therebelow, said bore being substantially smaller in cross section than said confined space; a piston slidably mounted in said confined space and formed with a longitudinally extending second bore; a tube slidably mounted in said first bore and affixed to said piston in communication with said second bore, said tube terminating on its upper extremity in a ring-shaped surface of substantially less area than the lower surface of said piston; cutter means supported from said body-defining means; means that move said cutter means into cutting pressure contact with said tubular member when said fluid under pressure is discharged into said confined space below said piston to move said piston upwardly therein, said pressure contact being proportional to the differential in area between said upper surface of said tube and said lower surface of said piston; and sealing means that slidably and sealingly engage said tube to prevent flow of said fluid between the exterior surface of said tube and the surface of said first bore.*

*12. A pipe reamer and mill as defined in claim 11 wherein said body-defining means has an orifice formed therein below the lowermost position to which said piston travels, said orifice being substantially smaller in cross-sectional area than the interior cross section of said tube, which orifice permits the escape of said fluid from said confined space but at a lesser rate than it can be discharged thereinto through said tube.*

*13. A pipe reamer and mill as defined in claim 11 wherein a passage is formed in said body-defining means above the uppermost position therein to which said piston rises, said passage extending from said confined space to a position on the exterior of said body-defining means, which passage permits the escape of fluid from said confined space above said piston to the exterior of said body-defining means by upward movement of said piston.*

References Cited in the file of this patent or the original patent

UNITED STATES PATENTS

| | | |
|---|---|---|
| 1,805,515 | Denny | May 19, 1931 |
| 1,913,636 | King | June 13, 1933 |
| 2,078,401 | McCann | Apr. 27, 1937 |
| 2,136,518 | Nixon | Nov. 15, 1938 |
| 2,622,679 | Ranson | Dec. 23, 1952 |